US009403500B2

United States Patent
Ishida et al.

(10) Patent No.: US 9,403,500 B2
(45) Date of Patent: Aug. 2, 2016

(54) AIRBAG DEVICE

(71) Applicant: Fuji Jukogyo Kabushiki Kaisha, Tokyo (JP)

(72) Inventors: Takeshi Ishida, Tokyo (JP); Tooru Yamashita, Tokyo (JP); Takashi Kamibayashi, Tokyo (JP); Akihiro Terauchi, Tokyo (JP); Kazuya Yamane, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/660,796

(22) Filed: Mar. 17, 2015

(65) Prior Publication Data
US 2015/0274110 A1    Oct. 1, 2015

(30) Foreign Application Priority Data

Mar. 28, 2014 (JP) .................. 2014-069669

(51) Int. Cl.
| | |
|---|---|
| *B60R 21/207* | (2006.01) |
| *B60R 21/015* | (2006.01) |
| *B60R 21/2334* | (2011.01) |
| *B60R 21/231* | (2011.01) |
| *B60R 21/0134* | (2006.01) |

(52) U.S. Cl.
CPC ..... *B60R 21/01512* (2014.10); *B60R 21/01538* (2014.10); *B60R 21/207* (2013.01); *B60R 21/2334* (2013.01); *B60R 21/23138* (2013.01); *B60R 21/0134* (2013.01); *B60R 2021/23107* (2013.01); *B60R 2021/23146* (2013.01); *B60R 2021/23161* (2013.01)

(58) Field of Classification Search
CPC ........... B60R 2021/23107; B60R 2021/23146; B60R 2021/23161; B60R 21/207
See application file for complete search history.

(56) References Cited

U.S. PATENT DOCUMENTS

| | | | | |
|---|---|---|---|---|
| 8,702,123 | B2 * | 4/2014 | Mazanek | ............... B60R 21/207 280/729 |
| 2004/0232666 | A1 * | 11/2004 | Sato | .................. B60R 21/23138 280/730.2 |

(Continued)

FOREIGN PATENT DOCUMENTS

| | | |
|---|---|---|
| JP | 2006-142958 A | 6/2006 |
| JP | 2006-315453 A | 11/2006 |

(Continued)

OTHER PUBLICATIONS

JPO Notification of Reasons for Refusal dated Jun. 16, 2015 and Decision of Grant dated Jan. 5, 2016.

*Primary Examiner* — Ruth Ilan
(74) *Attorney, Agent, or Firm* — McGinn IP Law Group, PLLC

(57) ABSTRACT

An airbag device is disposed beneath the lateral surface of a driver's seat backrest facing a front passenger seat, and beneath the lateral surface of a front passenger seat backrest facing a driver's seat. The air bag device has first and second airbags that are inflatable and deployable upon a collision of a vehicle equipped with airbag device. The inflated and deployed first airbag has a depressed portion on its outer side in a vehicle width direction near the shoulder of an occupant, and the second airbag inflates and deploys so as to fill the depressed portion. Upon the collision of the vehicle, when the body size of the occupant is greater than or equal to a predetermined size, only the first airbag inflates and deploys, whereas when the body size is smaller than the predetermined size, the first and second airbags inflate and deploy.

4 Claims, 5 Drawing Sheets

(56) References Cited

U.S. PATENT DOCUMENTS

| | | | |
|---|---|---|---|
| 2008/0231026 A1* | 9/2008 | Naito | B60R 21/23138 280/730.2 |
| 2011/0169250 A1* | 7/2011 | Breuninger | B60R 21/207 280/730.2 |
| 2012/0091697 A1* | 4/2012 | Wiik | B60R 21/23138 280/730.2 |
| 2014/0097601 A1* | 4/2014 | Fukawatase | B60R 21/231 280/730.2 |
| 2015/0274111 A1* | 10/2015 | Ishida | B60R 21/207 280/730.2 |

FOREIGN PATENT DOCUMENTS

| | | |
|---|---|---|
| JP | 2009-280023 A | 12/2009 |
| JP | 2010-115947 A | 5/2010 |
| JP | 2013-124063 A | 6/2013 |

* cited by examiner

AIRBAG DEVICE

CROSS-REFERENCE TO RELATED APPLICATIONS

The present application claims priority from Japanese Patent Application No. 2014-069669 filed on Mar. 28, 2014, the entire contents of which are hereby incorporated by reference.

BACKGROUND

1. Technical Field

The present invention relates to an airbag device for protecting an occupant such as a driver and a passenger in a vehicle against an impact due to a side collision, the vehicle having seats disposed apart from each other in a vehicle width direction.

2. Related Art

A method has been widely used in which an airbag device provided in a vehicle is activated to reduce an impact to an occupant when a collision of the vehicle occurs. A conventional airbag device is disposed in a steering wheel provided forward of the driver's seat or in an instrument panel provided forward of a front passenger seat so that forward movement of an occupant facing the airbag device is restrained. Thus, an impact to the occupant at the time of a head-on collision of a vehicle is reduced and the occupant may be protected from the head-on collision.

In recent years, a device has been developed that protects an occupant using an airbag device even at the time of a side collision of a vehicle. For example, what is called a side airbag device inflates between the side (door) of a vehicle body and the occupant to protect the occupant. Thus, the occupant is protected against a direct impact in a side collision of a vehicle as well as prevented from colliding with the side of the vehicle.

Such a conventional side airbag device is unable to restrain inward movement of the occupant in a vehicle width direction. For this reason, when a side collision of a vehicle occurs, the occupants on the driver's seat and the adjacent front passenger seat may collide with each other, or the occupants may collide with the backrest of the adjacent seat. In order to address such problems, an airbag device described in Japanese Unexamined Patent Application Publication (JP-A) No. 2010-115947 allows an airbag to expand upward, the airbag being housed in a center console provided between the driver's seat and the adjacent front passenger seat. Thus, the airbag expands between the driver's seat and the front passenger seat, thereby making it possible to prevent collision between a driver on the driver's seat and a passenger on the front passenger seat. When a passenger is on the front passenger seat, the airbag is supported by the passenger in the vehicle width direction. On the other hand, when a passenger is not on the front passenger seat, the airbag fills a space over the front passenger seat, the space facing the driver on the driver's seat, and the airbag is supported by the door near the front passenger seat. Thus, the expanded airbag is able to provide a reaction force for receiving an impact force in the vehicle width direction, and movement of the driver on the driver's seat toward the front passenger seat may be efficiently restrained.

The airbag of the airbag device described in JP-A No. 2010-115947 is caused to expand in an I-shape as viewed from the front, and thus when the upper half body of an occupant is moved inwardly in the vehicle width direction in the case of a side collision of a vehicle, the shoulder of the occupant first comes into contact with the airbag. Therefore, although inward movement of the shoulder of the occupant in a vehicle width direction is restrained, it is difficult to restrain inward movement of the neck of the occupant in the vehicle width direction. To cope with this, a depressed portion may be formed on a face of the airbag, which is to be contact with the shoulder of the occupant, so that the shoulder and neck of the occupant come into contact with the airbag simultaneously.

However, occupants may have a difference in body size. In particular adults and children have a large body size difference. For this reason, when a depressed portion is formed on an area of the airbag, which is to be contact with the shoulder of an occupant, the depressed portion may be near the head of a small occupant such as a child. In such a situation, in the case of a side collision of a vehicle, there is a possibility that the head or upper half body of a child may be caught in the depressed portion of the airbag.

SUMMARY OF THE INVENTION

The present disclosure has been designed in consideration of the circumstances described above, and an object thereof is to provide an airbag device that is used in a vehicle having seats disposed apart from each other in a vehicle width direction to restrain movement of an occupant in the vehicle width direction due to a side collision, and is capable of effectively restraining inward movement of the shoulder and neck of the occupant in the vehicle width direction regardless of the body size of the occupant.

An aspect of the present invention provides an airbag device used in a vehicle having seats disposed apart from each other in a vehicle width direction, the airbag device including: a first airbag that is inflatable and deployable inwardly from an inward lateral surface of a corresponding one of the seats in a vehicle width direction in a form according to a body size of a first occupant; a second airbag that is inflatable and deployable inwardly from the inward lateral surface of the corresponding seat in the vehicle width direction in a form according to a body size of a second occupant, the body size being smaller than the first occupant; an airbag device control unit that controls and causes the first airbag and the second airbag to inflate and deploy when a predetermined condition is satisfied; a body size detection unit that detects whether or not a seated occupant has a body size greater than or equal to a predetermined size. When the body size detection unit detects that the seated occupant has a body size greater than or equal to the predetermined size, the airbag device control unit controls and causes the first airbag to inflate and deploy, and controls and causes the second airbag not to inflate and deploy.

DETAILED DESCRIPTION

FIGS. 1 to 7 illustrate an implementation of the present invention.

Figure 1A:
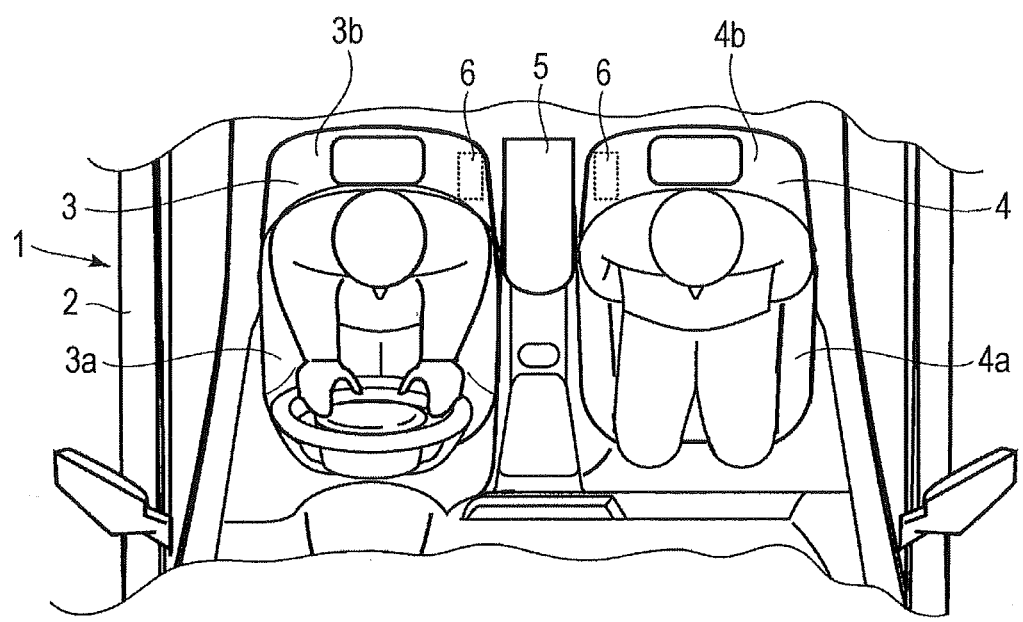
FIG. 1A is a schematic plan view of the front part of the vehicle cabin in normal conditions of a vehicle equipped with an airbag device in the present implementation.
Figure 1B:
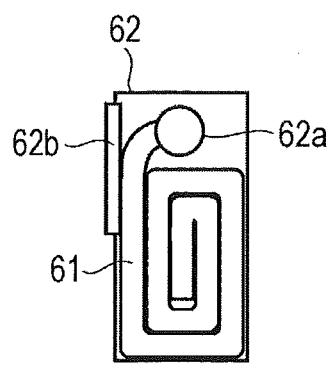
FIG. 1B is a schematic cross-sectional plan view of a first airbag housing.
Figure 1C:
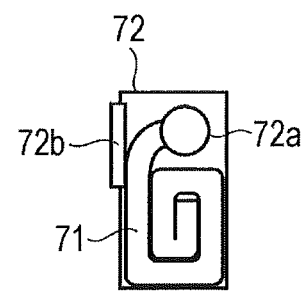
FIG. 1C is a schematic cross-sectional plan view of a second airbag housing.

As illustrated in FIG. 1A, in a vehicle 1 equipped with an airbag device in the present invention, a driver's seat 3 and a front passenger seat 4 are disposed in a vehicle width direction and provided independently to each other in the front part of the cabin of a vehicle body 2. In addition, the driver's seat 3 and the front passenger seat 4 are disposed apart from each other, and a center console 5 is provided between the driver's seat 3 and the front passenger seat 4.

The driver's seat 3 has a driver's seat seating surface 3a on which a driver sits, a driver's seat backrest 3b that extends upward from the rear of the driver's seat seating surface 3a and supports the back of the driver. The driver's seat seating surface 3a is freely movable along a seat rail (not illustrated) which is provided on the floor of the vehicle cabin and which extends in the fore-and-aft direction of the vehicle, and thus the position of the driver's seat seating surface 3a in the fore-and-aft direction with respect to the vehicle body may be changed. The driver's seat backrest 3b is freely rotatable about the shaft at a lower portion in the fore-and-aft direction of the vehicle, and the backrest angle is adjustable. The front passenger seat 4 also has a front passenger seat seating surface 4a and a front passenger seat backrest 4b, and so the front passenger seat 4 has a similar configuration to that of the driver's seat 3. The center console 5 is provided in the fore-and-aft direction of the vehicle and includes a storage box for storing small articles and a drink holder for holding a drink container.

An airbag device 6 is provided beneath each of the lateral face of the driver's seat backrest 3b, facing the front passenger seat 4 and the lateral face of the front passenger seat backrest 4b, facing the driver's seat 3. As illustrated in the cross-sectional plan view of the airbag device 6 of FIGS. 1B and 1C, the airbag device 6 includes a first airbag 61 and a second airbag 71 which are inflatable and deployable at the time of collision of the vehicle 1, a first airbag housing 62 that houses the first airbag 61 which is folded, and a second airbag housing 72 that houses the second airbag 71 which is folded.

Figure 2:
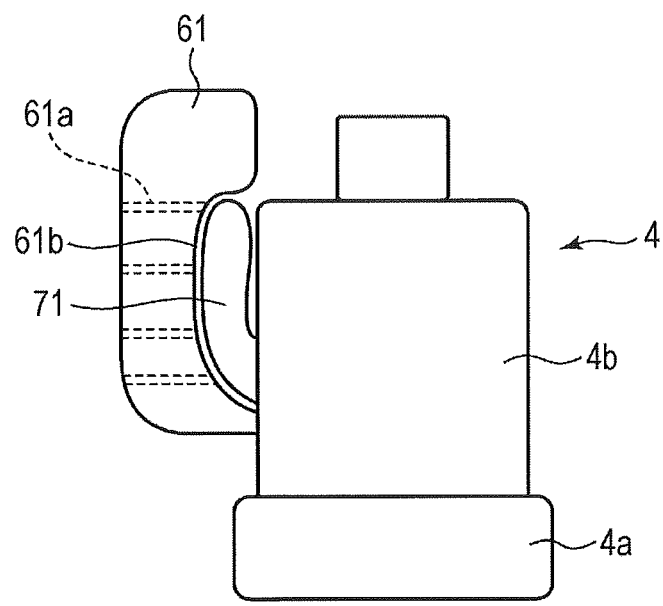
FIG. 2 is a schematic front view of a front passenger seat and its peripheral part when the first airbag and the second airbag of the present implementation inflate and deploy.
Figure 3:
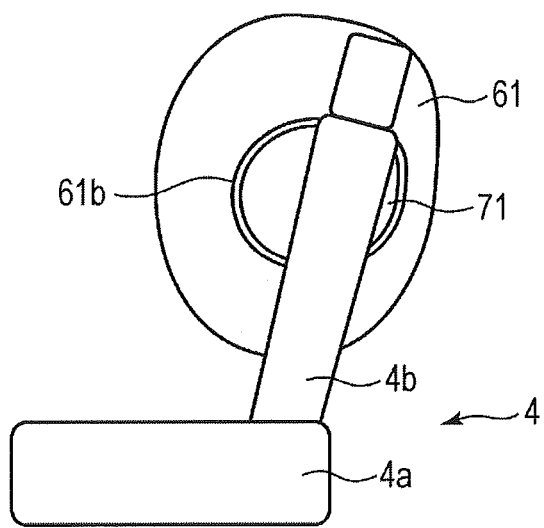
FIG. 3 is a schematic right side view of the front passenger seat and its peripheral part when the first airbag and the second airbag of the present implementation inflate and deploy.

The first airbag 61 is in a shape which is inflatable and deployable by extending upward and extending in the vehicle width direction and the vehicle fore-and-aft direction. The first airbag 61 has a tether 61a attached to the inner surface thereof for regulating the shape of the first airbag 61 when inflating and deploying. The tether 61a regulates the shape of the first airbag 61 in the width direction, the vertical direction, and the fore-and-aft direction of the vehicle when the first airbag 61 inflates and deploys. The tether 61a forms a depressed portion 61b in part of the first airbag 61. Specifically, as illustrated in FIG. 2, the tether 61a pulls an outer surface of the first airbag 61 inwardly in the vehicle width direction so as to regulate the distance between the outer surface and the inner surface of the first airbag 61 in the vehicle width direction to be reduced, the outer surface being from approximately the center to a lower position of the first airbag 61 in the vertical direction. The portion from approximately the center to a lower position of the first airbag 61 in the vertical direction faces the shoulder of an occupant when the first airbag 61 inflates and deploys. Consequently, as illustrated in FIG. 3, the depressed portion 61b is formed on an outward portion of the first airbag 61 in the vehicle width direction, the outward portion facing the shoulder of the occupant when the first airbag 61 inflates and deploys.

The first airbag housing 62 is provided with a first inflator 62a which is connected to the first airbag 61. A gas discharged from the first inflator 62a is supplied into the first airbag 61. In addition, the first airbag housing 62 is provided with a first cover 62b inwardly in the vehicle width direction, through which the first airbag 61 moves upward from the first airbag housing 62 when the first airbag 61 inflates and deploys. The first airbag 61 is housed in the first airbag housing 62 in a folded manner so as to be inflatable and deployable upward, and when a gas is supplied into the first airbag 61 from the first inflator 62a, the first airbag 61 moves upward from the first cover 62b and starts to inflate and deploy.

The second airbag 71 is formed to be smaller than the first airbag 61 in the width direction, the vertical direction, and the fore-and-aft direction of the vehicle. The size of the second airbag 71 when inflated and deployed is approximately the same as the size of the depressed portion 61b of the first airbag 61. Therefore, as illustrated in FIG. 2 and FIG. 3, the inflated and deployed second airbag 71 is able to fill the depressed portion 61b of the first airbag 61 which has inflated and deployed.

The second airbag housing 72 is provided above the first airbag housing 62 which is in the inner part of the driver's seat backrest 3b in the vehicle width direction and above the first airbag housing 62 which is in the inner part of the front passenger seat backrest 4b in the vehicle width direction. The second airbag housing 72 is provided with a second inflator 72a which is connected to the second airbag 71. A gas discharged from the second inflator 72a is supplied into the second airbag 71. In addition, the second airbag housing 72 is provided with a second cover 72b inwardly in the vehicle width direction, through which the second airbag 71 moves upward from the second airbag housing 72 when the second airbag 71 inflates and deploys. For this reason, when a gas is supplied into the second airbag 71 from the second inflator 72a, the second airbag 71 starts to inflate and deploy inwardly in the vehicle width direction from the second cover 72b. It is to be noted that the second cover 72b is located in a position that faces the depressed portion 61b when the first airbag 61 inflates and deploys.

Figure 4:
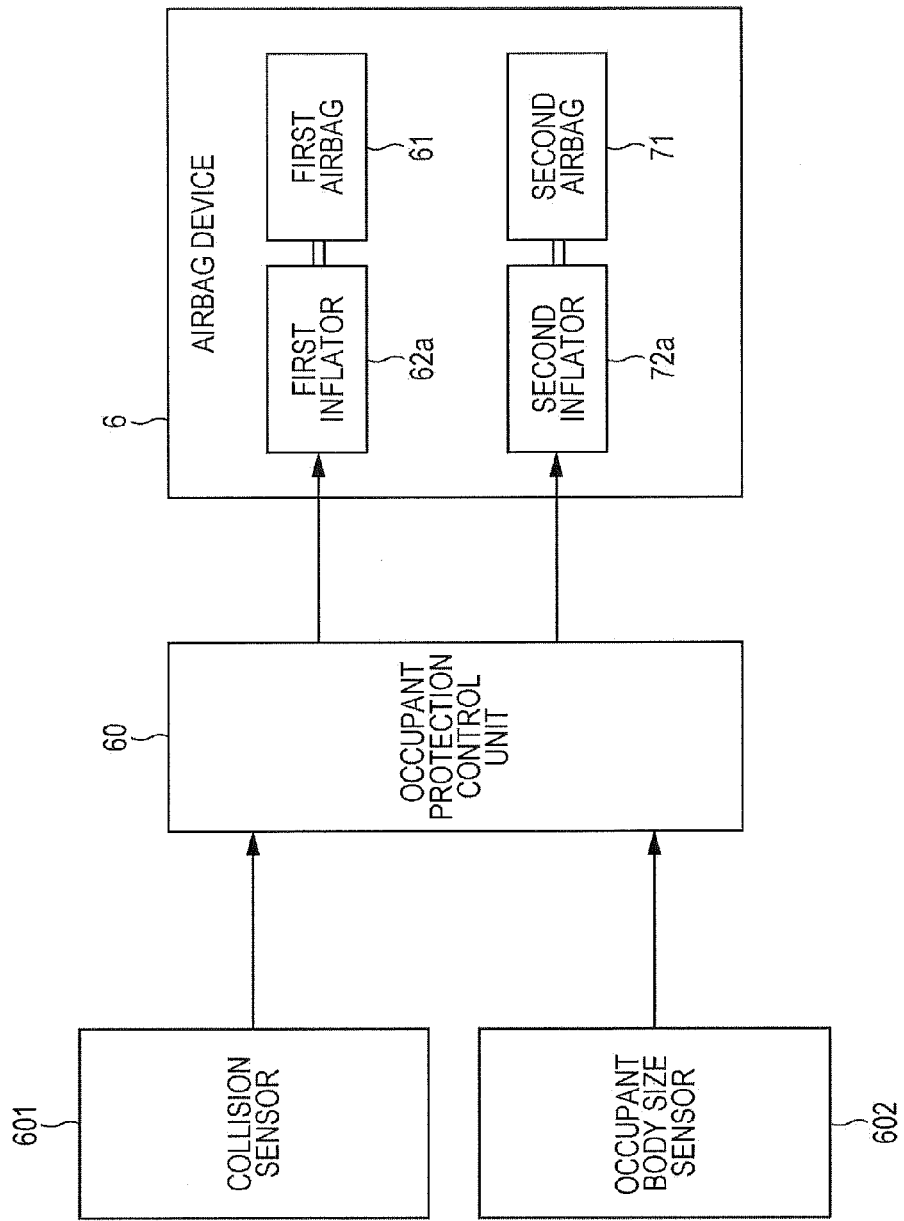
FIG. 4 is a block diagram illustrating input/output of control signals related to the airbag device in the present implementation.

As illustrated in FIG. 4, the airbag device 6 is controlled by an occupant protection control unit 60. The occupant protection control unit 60 is, for example, a CPU or an ECU, and has an input side and an output side, the input side being connected to a collision sensor 601 that detects a collision and to an occupant body size sensor 602 which is a camera sensor that identifies the body size of an occupant, the output side being connected to the first inflator 62a and the second inflator 72a. The collision sensor 601 detects application of an impact to the vehicle 1. The occupant body size sensor 602 captures and identifies an occupant at the time of start of the engine of the vehicle 1. It is to be noted that the occupant body size sensor 602 may capture and identify an occupant for every predetermined time not at the time of start of the engine of the vehicle 1.

In the case where the collision sensor 601 detects a collision of the vehicle 1, a detection signal is outputted from the collision sensor 601 to the occupant protection control unit 60. Upon receiving an input of the detection signal, the occupant protection control unit 60 outputs a control signal to the first inflator 62a and the second inflator 72a, the control signal for starting supply of gas to the first airbag 61 and the second airbag 71. The first inflator 62a and the second inflator 72a, which have received the control signal, supply gas to the first airbag 61 and the second airbag 71, respectively. The first inflator 62a provided in the first airbag housing 62 of the driver's seat backrest 3b and the first inflator 62a provided in the first airbag housing 62 of the front passenger seat backrest 4b start supply of gas almost simultaneously. It is to be noted that a collision prediction device for predicting a collision of the vehicle 1 based on the conditions of the vehicle 1 and/or outside the vehicle 1 may be connected to the input side of the occupant protection control unit 60, and when a collision of the vehicle 1 is predicted, a control signal may be outputted to the first inflator 62a and the second inflator 72a, the control signal for starting supply of gas to the first airbag 61 and the second airbag 71.

Figure 5:
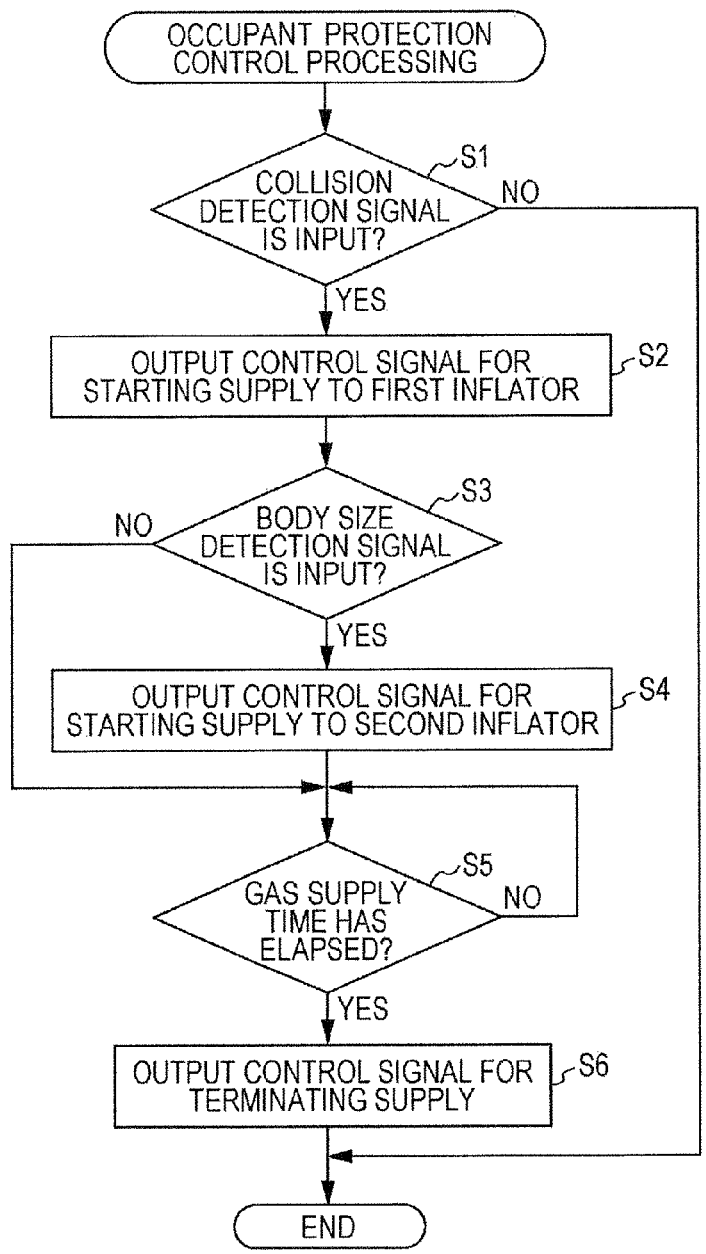
FIG. 5 is a flow diagram illustrating the occupant protection control processing performed by an occupant protection control unit in the present implementation.

Next, the occupant protection control processing, which is performed by the occupant protection control unit 60 for operating the airbag device 6 in the case of a side collision of the vehicle 1, will be described with reference to FIG. 5. It is to be noted that the process flow illustrated in FIG. 5 is performed for every predetermined period (for example, 4 milliseconds).

First, in step S1, the occupant protection control unit 60 determines whether or not a collision detection signal has been input from the collision sensor 601, the collision detection signal indicating a collision of the vehicle 1. When the occupant protection control unit 60 has received an input of a collision detection signal from the collision sensor 601, the processing flow proceeds to step S2. When the occupant protection control unit 60 has not received an input of a collision detection signal, the occupant protection control processing is terminated.

In step S2, the occupant protection control unit 60 performs processing of outputting a control signal to the first inflator 62a for commanding start of gas supply. Consequently, a gas is supplied into the first airbag 61 from the first inflator 62a, so that the first airbag 61 inflates and deploys.

At this point, the first airbag 61 moves upward and inflates and deploys in the width direction and the fore-and-aft direction of the vehicle, and the depressed portion 61b is formed on an outward portion (from approximately the center to a lower position of the first airbag 61 in the vertical direction) in the vehicle width direction, the outward portion facing the shoulder of the occupant.

In step S3, the occupant protection control unit 60 determines whether or not a signal is input from the occupant body size sensor 602, the signal indicating detection of the body size of the occupant smaller than a predetermined size. "The body size of the occupant smaller than a predetermined size" refers to a body size such that the head of the occupant on the driver's seat 3 or the occupant front passenger seat 4 is at a position that faces the depressed portion 61b of the first airbag 61 which has inflated and deployed. When the occupant has a small body size like a child, the signal is output from the occupant body size sensor. When the body size of the occupant is smaller than the predetermined size, the processing flow proceeds to step S4, and when the body size of the occupant is greater than or equal to the predetermined size, the processing flow proceeds to step S5. In the present implementation, an occupant having a body size greater than or equal to the predetermined size corresponds to the first occupant in the present invention, and an occupant having a body size smaller than the predetermined size corresponds to the second occupant in the present invention.

When the body size of the occupant is smaller than the predetermined size, in step S4, the occupant protection control unit 60 performs processing of outputting a control signal for commanding start of gas supply to the second inflator 72a. Consequently, a gas is supplied into the second airbag 71 from the second inflator 72a, so that the second airbag 71 inflates and deploys.

The second cover 72b of the second airbag housing 72 is located in a position that faces the depressed portion 61b when the first airbag 61 inflates and deploys. For this reason, the second airbag 71 supplied with gas from the second inflator 72a inflates and deploys to the depressed portion 61b of the first airbag 61. Since the second airbag 71 inflates and deploys to a size comparable to the size of the depressed portion 61b of the first airbag 61, the second airbag 71 fills the depressed portion 61b of the first airbag 61 which has inflated and deployed.

A sensor may be provided for detecting whether the first airbag 61 has inflated and deployed for longer than or equal to a predetermined time, and the second inflator 72a may start gas supply under the condition that the first airbag 61 has inflated and deployed for longer than or equal to the predetermined time. That is, after determination of YES in step S3 of FIG. 5, determination processing may be added for determining whether or not the first airbag 61 has inflated and deployed for longer than or equal to the predetermined time. Thus, the second airbag 71 starts to inflate and deploy after the first airbag 61 has inflated and deployed to some extent or fully. Therefore, the second airbag 71 is able to inflate and deploy so as to fill the depressed portion 61b of the first airbag 61 without preventing the inflation and expansion of the first airbag 61.

In step S5, the occupant protection control unit 60 determines whether or not a predetermined gas supply time has elapsed since the first airbag 61 and the second airbag 71 started to inflate and deploy. When the predetermined time has elapsed, the processing flow proceeds to step S6, and when the predetermined time has not elapsed, the step S5 is repeatedly performed until the predetermined time elapses.

In step S6, the occupant protection control unit 60 performs processing of outputting a control signal for terminating supply of gas to the first inflator 62a and the second inflator 72a. It is to be noted that when the second inflator 72a is not supplying gas, the control signal may be output to the first inflator 62a only. After this processing is terminated, the occupant protection control processing is terminated.

Figure 6:
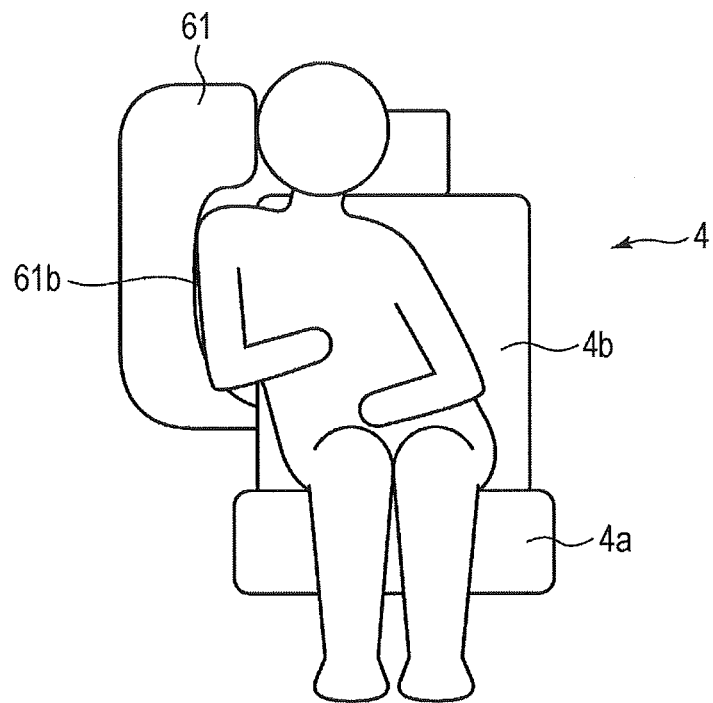
FIG. 6 is an exemplary schematic front view of a front passenger seat in the case of a side collision of the vehicle in the present implementation.
Figure 7:
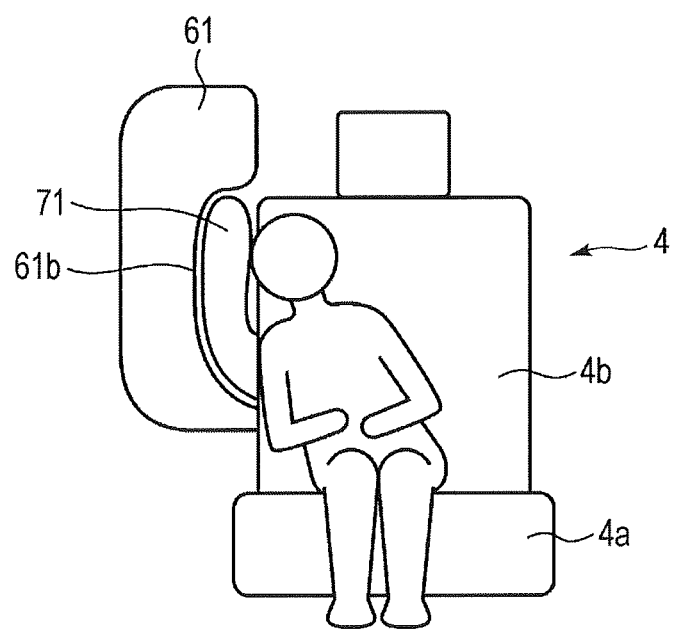
FIG. 7 is an exemplary schematic front view of a front passenger seat in the case of a side collision of the vehicle in the present implementation.

In this manner, when the body size of the occupant is greater than or equal to the predetermined size, only the first airbag 61 inflates and deploys, whereas when the body size of the occupant is smaller than the predetermined size, the second airbag 71 inflates and deploys along with the first airbag 61. Thus, as illustrated in FIG. 6, when the occupant has a body size greater than or equal to the predetermined size, the shoulder of the occupant is protected by the depressed portion 61b of the first airbag 61 and the head of the occupant is protected by the upper portion of the first airbag 61 above the depressed portion 61b at the time of a collision of the vehicle 1. On the other hand, when the occupant has a body size smaller than the predetermined size, the second airbag 71 inflates and deploys along with the first airbag 61, and the depressed portion 61b of the first airbag 61 is filled by the second airbag 71. Therefore, as illustrated in FIG. 7, when the occupant such as a child has a body size smaller than the predetermined size, it is possible to prevent the occupant from being pushed into the depressed portion 61*b* of the first airbag 61 at the time of a collision of the vehicle 1. Consequently, movement of the occupant in the vehicle width direction due to the impact of a side collision of the vehicle 1 may be effectively restrained.

The second airbag 71, which restrains the movement in the vehicle width direction of an occupant having a body size smaller than the predetermined size, inflates and deploys to a size smaller than the first airbag 61, and so has a small reaction force. However, the first airbag 61 supports the inflated and deployed second airbag 71 with the depressed portion 61*b*, and thus it is possible to ensure a sufficient reaction force for restraining the movement of the occupant.

Furthermore, although the first airbag 61 provides a less reaction force, particularly, at the depressed portion 61*b* compared with other portions, inflation and expansion of the first airbags 61 provided in the adjacent driver's seat 3 and front passenger seat 4 in the vehicle width direction cause the inner portions of the first airbags 61 in the vehicle width direction to come into contact with each other and the inner portions are supported by each other. In this manner, it is possible for the first airbags 61 disposed in the vehicle width direction to support each other to increase the reaction force.

While the first airbag 61 and the second airbag 71 are provided in the driver's seat backrest 3*b* and the front passenger seat backrest 4*b* in the present implementation, the second airbag 71 may be provided in the front passenger seat backrest 4*b* only because the occupant on the driver's seat 3 is not assumed to be a child.

The airbag device 6 in the present implementation restrains movement of the occupants on the driver's seat 3 and the front passenger seat 4 in the vehicle width direction. Alternatively, the airbag device 6 may be used also in a vehicle which is provided with three or more seats such as rear seats from each other in the vehicle width direction.

In the present implementation, the first airbag 61 is housed in the first airbag housing 62, and inflates and deploys upon receiving a supply of gas from the first inflator 62*a*. Also, the second airbag 71 is housed in the second airbag housing 72, and inflates and deploys upon receiving a supply of gas from the second inflator 72*a*. However, without being limited to this, the second airbag 71 may be housed in the first airbag housing 62, for example, so as to inflate and deploy upon receiving a supply of gas from the first inflator 62*a*. In this configuration, in order to cause only the first airbag 61 to inflate and deploy, gas supply is controlled such that an on-off valve provided in the connecting portion between the first inflator 62*a* and the second airbag 71 is closed so as to supply a gas to the first airbag 61 only.

The invention claimed is:

1. An airbag device for a vehicle having seats disposed apart from each other in a vehicle width direction, the airbag device comprising:
    a first airbag that is inflatable and deployable inwardly from an inward lateral surface of a corresponding one of the seats in a vehicle width direction in a form according to a body size of a first occupant;
    a second airbag that is inflatable and deployable inwardly from the inward lateral surface of the corresponding seat in the vehicle width direction in a form according to a body size of a second occupant, the body size being smaller than the first occupant;
    an airbag device control unit that controls and causes the first airbag and the second airbag to inflate and deploy when a predetermined condition is satisfied; and
    a body size detection unit that detects whether or not a seated occupant has a body size greater than or equal to a predetermined size,
    wherein when the body size detection unit detects that the seated occupant has a body size greater than or equal to the predetermined size, the airbag device control unit controls and causes the first airbag to inflate and deploy, and controls and causes the second airbag not to inflate or deploy,
    wherein the inflated and deployed first airbag has a depressed-shaped portion on an outer side in the vehicle width direction, and
    wherein the second airbag inflates and deploys in the depressed-shaped portion of the first airbag.

2. The airbag device according to claim 1, wherein the inflated and deployed first airbag has a depressed-shaped portion that faces an upper portion of the corresponding seat.

3. The airbag device according to claim 1, wherein when another predetermined condition is satisfied, the airbag device control unit starts to control and cause the first airbag to inflate and deploy earlier than to control and cause the second airbag to inflate and deploy.

4. The airbag device according to claim 1, wherein when another predetermined condition is satisfied, the airbag device control unit starts to control and cause the first airbag to inflate and deploy earlier than to control and cause the second airbag to inflate and deploy.

* * * * *